Feb. 10, 1970  J. R. YOUNG  3,494,148
RECIRCULATING BALL SLIP JOINT ASSEMBLY
Filed Sept. 29, 1967  3 Sheets-Sheet 1
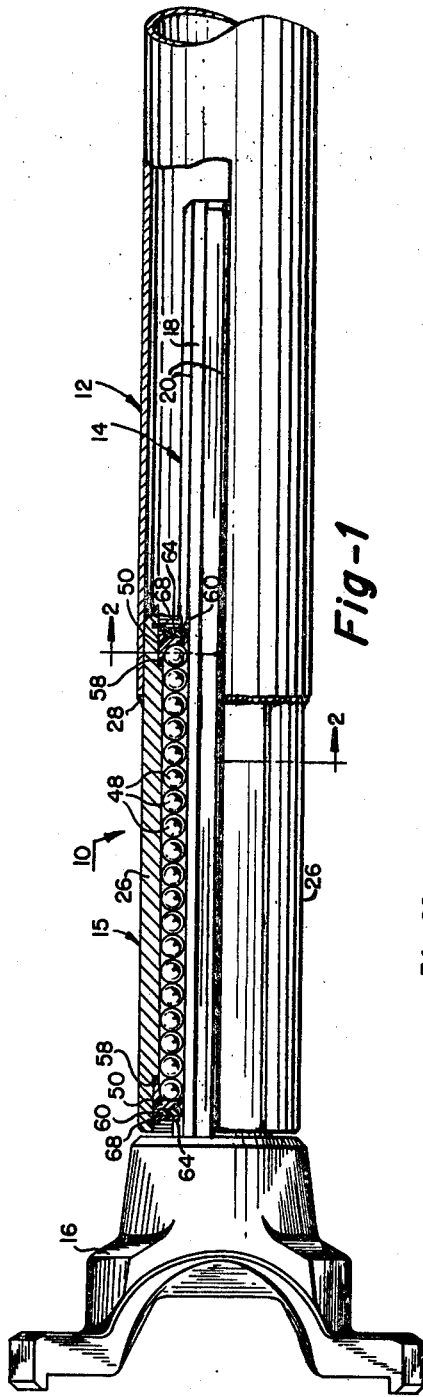
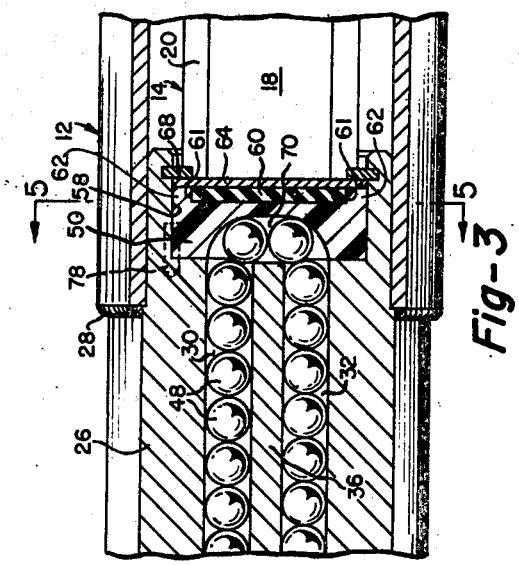
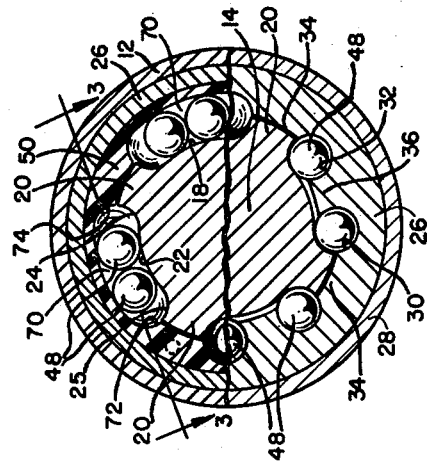
INVENTOR
John R. Young
BY *Strauch, Nolan, Neale, Nies & Kurz*
ATTORNEYS INVENTOR
John R. Young Feb. 10, 1970  J. R. YOUNG  3,494,148
RECIRCULATING BALL SLIP JOINT ASSEMBLY
Filed Sept. 29, 1967  3 Sheets-Sheet 3

INVENTOR
*John R. Young*

BY *Strauch, Nolan, Neale, Nies & Kurz*
ATTORNEYS

United States Patent Office 3,494,148
Patented Feb. 10, 1970

3,494,148
RECIRCULATING BALL SLIP
JOINT ASSEMBLY
John R. Young, Allegan, Mich., assignor to North
American Rockwell Corporation, Pittsburgh, Pa., a
corporation of Delaware
Filed Sept. 29, 1967, Ser. No. 671,747
Int. Cl. F16d 3/06
U.S. Cl. 64—23                                      10 Claims

ABSTRACT OF THE DISCLOSURE

An extensible shaft assembly embodying a number of recirculating antifriction bearing units confined between an outer and an inner shaft member and adapted to transmit driving torque from one shaft member to the other while simultaneously allowing substantially frictionless relative axial movement between the shaft members, the antifriction bearing units being retained in one of the shaft members upon withdrawal of the other shaft member.

Background of invention

The invention refers to shaft assemblies and specifically to extensible drive assemblies such as are employed in vehicle, power-takeoff and implement drives. In such drive assemblies, compensation for variations in length during operation must be provided for, which in the most common form, is accomplished by making the drive shaft in two parts, telescoping one within the other. Conventional torque transmitting telescoping drive shaft assemblies comprised square shafts in a square tube or splined shafts in a splined tube. However, these arrangements are unsatisfactory when used in high torque load applications due to the excessive friction created between the plain sliding surfaces which tended to resist axial sliding movements of the shaft members. Galling and excessive wear causing backlash are further problems created by these joints.

It has been suggested to incorporate antifriction bearing elements between the telescoping shaft members to allow relative frictionless extension of the shaft members under torque load. Examples of such assemblies are disclosed, for instance, in U.S. Patents Nos. 846,079 or 2,952,145. Later provision was made to recirculate the bearing assemblies to improve the load distribution on the bearing elements such as in U.S. Patents Nos. 2,979,-147 or 2,995,908.

However, in all of the prior units, difficulties have been encountered in assembly and disassembly of the shaft members for servicing or to permit temporary disconnection of an implement drive when not needed since, when the inner shaft member is withdrawn from the outer shaft member the antifriction bearing elements fall out, unless they are caged as the needle bearings in aforementioned U.S. Patent No. 2,995,908. However, caged bearing assemblies in sliding shaft joints have been found to be highly undesirable since, apart from the added cost and weight, the cages are often crushed or bent out of shape under load thus jamming the antifriction elements and rendering the slip joint inoperative. Prior slip joints having the return channels or races for the antifriction elements provided on the inner shaft member such as in U.S. Patents Nos. 1,918,108 or 2,791,894 are difficult to assemble since it is extremely troublesome to keep the antifriction elements in the races along the surface of the shaft when assembling the outer shaft member.

In other prior constructions such as in U.S. Patents Nos. 2,908,152 (Re. 25,489) or 2,979,147 which employ straight grooves and separable end caps which provide the return channels or tracks for the antifriction elements, difficulties are frequently encountered during assembly in correctly lining up the straight grooves in the inner and outer shaft members with the return channels or tracks in the end caps. Furthermore, as in other prior embodiments, the antifriction elements are only loosely retained between the inner and outer shaft members so that upon withdrawal of the inner shaft member they often fall out of the assembly which makes servicing difficult and time consuming.

Additionally, metal return track and cap members for the recirculating antifriction elements are objectionable on the basis of both cost and performance. Die cast parts have low wear and shock resistance. Forged or sand cast parts lack the required dimensional accuracy and machined steel parts are prohibitively expensive.

Summary of invention

The present invention provides improved antifriction slip joint assemblies which eliminate or significantly reduce the foregoing disadvantages of the known prior devices. The present invention provides, among other things, means for accurately positioning the end caps in relation to the straight grooves so that the arcuate return grooves in the end caps will be correctly aligned with the straight grooves. The invention also provides means to retain the rolling antifriction elements on one of the shaft members so that the other shaft member can be withdrawn without danger of the antifriction elements falling out of the grooves.

Accordingly, an important object of the present invention resides in the provision of positioning means for the return end caps in recirculating antifriction bearing slip joint assemblies to correctly align the arcuate return grooves in the end cap with the straight grooves in the shaft members and to prevent loosening of the end caps and thus rotational displacement of the end caps during rotation.

A further object of the present invention is the provision of means associated with the grooves in the outer shaft member and the arcuate grooves in the end caps to retain the antifriction elements in the grooves independently of the inner shaft member so that the inner shaft member may be withdrawn without disturbing the retained position of the antifriction elements in the outer shaft grooves and end caps.

Another object of the present invention resides in the provision of improved return track end cap members in recirculating slip joint assemblies made of a molded reinforced thermoplastic resin to reduce costs and to reduce or eliminate wear on the arcuate track and galling of the antifriction elements.

Further objects and novel features will become evident in the following detailed description with reference to the attached drawings illustrating a preferred embodiment.

Description of drawings

FIGURE 1 is a side view, partly in section, of the slip joint assembly of the present invention;

FIGURE 2 is an enlarged transverse section through the slip joint taken along line 2—2 of FIGURE 1;

FIGURE 3 is a fragmentary longitudinal section along the center of one antifriction unit taken along line 3—3 of FIGURE 2;

Description of preferred embodiment

Figure 4:
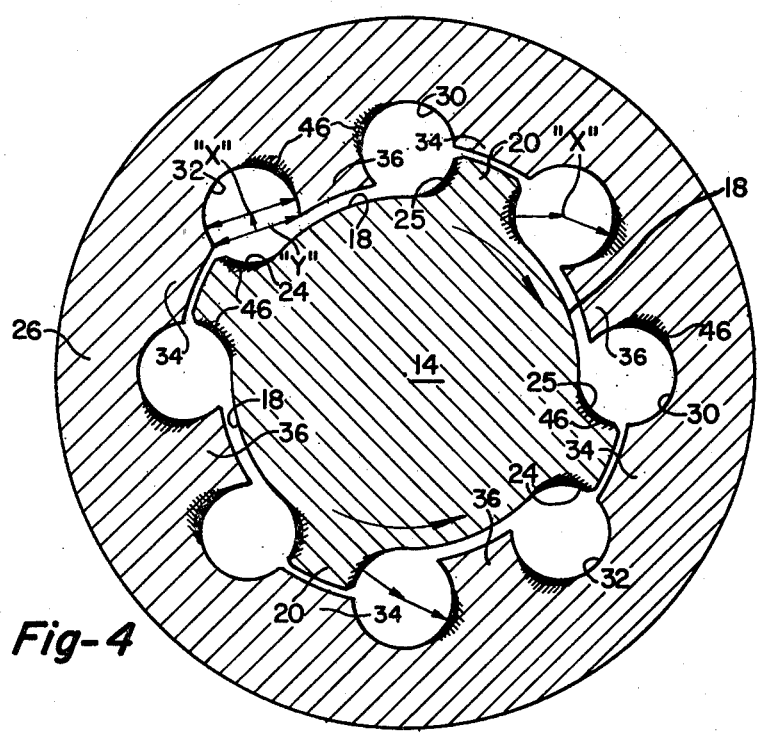
FIGURE 4 is an enlarged partly schematic transverse section similar to FIGURE 2 showing the relation of the grooves in the associated shaft members but with the ball members removed.

With continuing reference to the drawings there is illustrated in FIGURE 1 a slip joint shaft assembly 10 comprised of a tubular outer shaft member 12 and inner shaft member 14 telescopically received in coaxial alignment within the outer shaft member and drivingly connected thereto by an antifriction bearing assembly 15 associated with the outer shaft member 12.

For driving connection with respective driving and driven members (not shown) the shaft members 12, 14 may each be provided with yokes or drive flanges 16 one of which is shown at the outer end of shaft 14.

The inner shaft member 14 is provided along its surface with longitudinal grooves 18 circumferentially equally spaced apart so as to provide longitudinal ribs or splines 20 between the grooves 18. The bottom surface of the grooves 18 is curved transversely to the axis of the shaft 14 on a radius having the center of the shaft as its center and merges smoothly into arcuate longitudinal side surfaces 24 and 25.

The tubular outer shaft member 12 is provided with a reinforced sleeve 26 constituting the housing for the antifriction bearing assembly 15 welded as at 28 or otherwise secured to member 12 and which forms an extension of the shaft member 12. As shown in FIGURES 2 and 4 the internal surface of the sleeve 26 is provided with angularly equally spaced pairs of longitudinal grooves 30, 32 each pair being separated from the adjacent pair by longitudinal land portions 34. As best shown in FIGURE 4 the grooves are, in section, formed on circular arcs, the arcs being somewhat greater than 180° in length. The grooves in each pair of grooves 30, 32 in the sleeve 26 are spaced apart a predetermined distance to define longitudinal guide ribs or splines 36 between them, which extend radially inwardly towards the inner shaft member. The inner surface of guide ribs 36 between the associated grooves 30, 32 are formed on a smaller radius than the corresponding surface of the land portions 34 between any adjoining pair of grooves.

With specific reference to FIGURES 2 and 4, the inner shaft member 14 is positioned within the sleeve 26 to dispose each spline 20 directly underneath one of the land portions 34 and to dispose the shaft grooves 18 in bridging relation to one pair of grooves 30, 32. It will be noted that the width of the shaft grooves 18 is equal to the combined width of any pair of grooves 30, 32.

The walls of the grooves 30, 32 and the sides 24 and 25 of the shaft grooves 18 are all arcuately formed and, in assembled position as illustrated in FIGURE 4, have a common radius and a common center "x."

The tracks formed by the grooves 18 on the shaft 14 and the associated pair of grooves 30, 32 in the sleeve 26 may be conveniently formed by milling and/or broaching guaranteeing proper dimensioning and correct angular spacing of the grooves in relation to each other.

The sides 24, 25 of the shaft grooves 18 and the sleeve grooves 30, 32 are surface hardened, preferably by induction heating, found to be best suited for localized hardening without adverse effects on other areas of the shaft or sleeve where heating is not wanted.

The tracks formed by the pairs of grooves 30, 32 in the sleeve 26 and on each of the associated grooves 18 on the shaft 14 are adapted to receive antifriction rolling elements such as balls 48 which are of a diameter just slightly less than the diameter of the grooves 30, 32 to allow for rolling of the balls without excessive play but with a minimum of friction. In completely assembled condition, the balls 48 completely fill the grooves with the balls abutting each other.

The balls 48 are placed in the grooves 30, 32 by inserting them axially along the grooves from one end of the sleeve 26. The balls are retained within the grooves 30, 32 since the distance "y" across the throat of the groove is less than the diameter of the balls.

The balls 48 as herein illustrated are preferably carried by the sleeve 26 to minimize the length of the internal grooves 30, 32 which have to be broached in the sleeve. The length of the internal shaft 14 as well as the shaft grooves 18 will, of course, be determined by the requirements of a particular installation. The shaft grooves 18, however, are less difficult to produce than the internal sleeve grooves.

Figure 5:
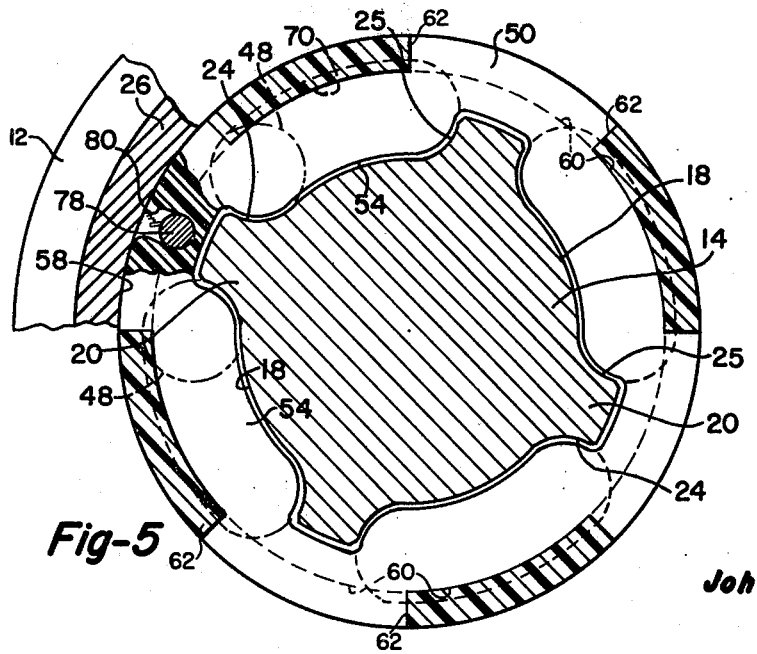
FIGURE 5 is an enlarged end view partly in section

The balls 48 are held in the sleeve 26 against axial displacement by identical end cap members 50 received in counter bores 58 provided at both ends of the sleeve 26. The cap members are splined to the inner shaft 14 by protrusions 54 which extend into the grooves 18. As clearly illustrated in FIGURE 5 sufficient axial and radial clearance is provided between the internal surfaces of the end cap members and the inner shaft 14 to prevent the imposition of a torque load on the caps.

The interior of the sleeve 26 is sealed by sealing members 60 which may be of rubber or the like, and are sandwiched between the end caps 50 and back-up members or washers 64 and both end caps and seal assemblies are axially retained in the sleeve by means of retaining rings 68. The seals 60 are splined to the shaft 14 in such fashion as to completely bridge the radial space between the shaft 14 and sleeve 26 to retain the lubricant and to prevent entry of dirt and water into the sleeve 26. The seals 60 are peripherally notched as at 61 to receive projections 62 on the cap members 50 which extend to the back-up members 64 to transmit thrust loads directly to the retaining rings 68.

The cap members 50 are each provided with arcuate recesses 70 corresponding in number to the number of pair of grooves 30, 32 and the shaft grooves 18. The arcuate recesses 70 are formed with a radius corresponding substantially with the radius of the balls 48 and extend along a radially and transversely curved path across the shaft grooves 18. The sides of the arcuate recesses 70 are in substantial alignment with the sides of the sleeve grooves 30 and 32, thus, bridging each associated pair of sleeve grooves, as shown in FIGURE 3. Thus, upon assembly of the unit with full complements of balls 48 an endless track is provided for the balls with the recesses 70 in the end caps 50 forming the return channels or tracks for the balls to allow them to pass from sleeve groove 30 to groove 32 or vice versa.

Figure 6:
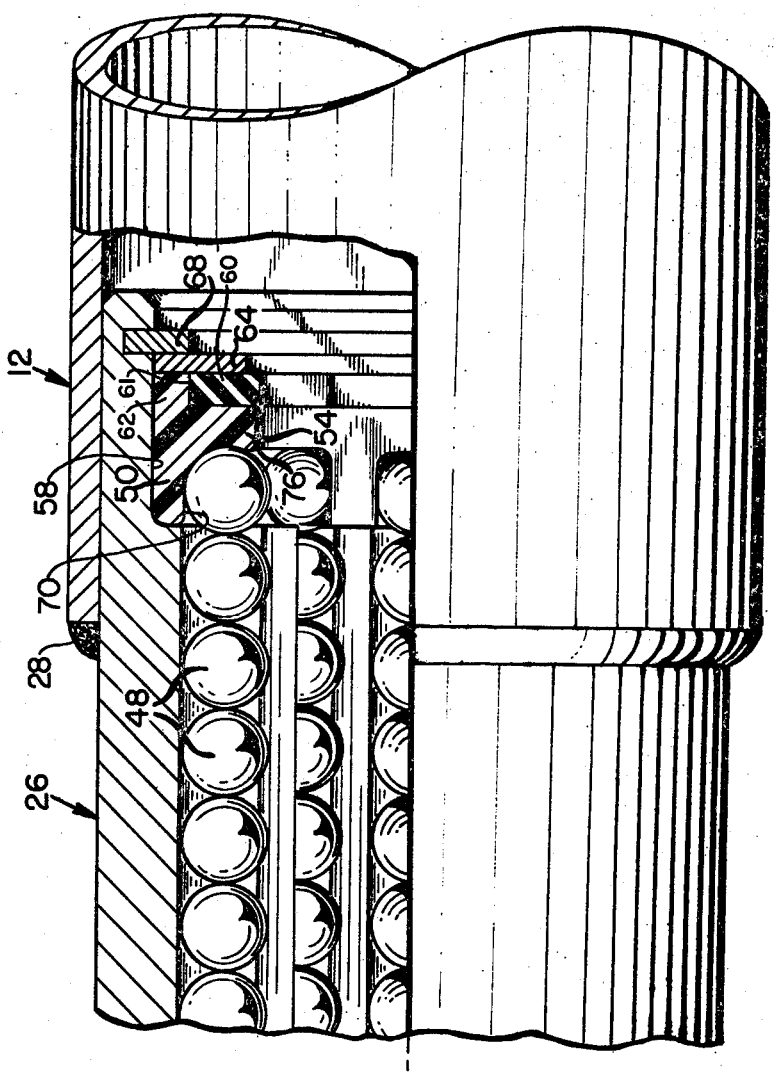
FIGURE 6 is an enlarged fragmentary view partly in section of the assembly with the inner shaft removed.

With particular reference to FIGURE 6, which shows the sleeve 26 and antifriction bearing assembly separated from the shaft 14, the inner edges of the recesses 70 in the end caps 50 provide a transversely arcuate ledge 76 along which the balls 48 travel. Thus, it is impossible for the balls 48 to fall out of the end caps when the inner shaft 14 is not in place so the shaft nembers 12 and 14 may be safely separated from each other without particular caution in regard to the disposition of the antifriction bearing elements.

To assure proper positioning of the end caps 50 within the sleeve 26 and to align each of the arcuate tracks 70 with one pair of grooves 30 and 32, a guide pin o rdowel 78 is provided at the inner ends of the counterbores 58 in the sleeve 26 to fit into a notch 80 provided in the outer surface of the end caps. By this means the end caps will be correctly located and held in position so that the slight rotational movement of the shaft 14 relative to the sleeve 26 upon transmission of driving torque will not affect the position of the end caps 50 in relation to the sleeve grooves 30, 32.

Preferably, the end caps 50 are made of a glass fiber reinforced synthetic material, such as nylon or the like, which has excellent bearing properties and outstanding wear characteristics. The use of such material considerably minimizes the adverse effect caused by shock load impact during rapid reciprocatory movement between the shaft members 12 and 14. The end caps may be easily molded to final dimensions thus eliminating the machining necessary in the manufacture of cast metal members.

The antifriction bearing assembly 15 is assembled in the following manner. With one end cap assembly 50 in place the sleeve 26 is held vertically. The balls 48 are pushed down the grooves 30 or 32 to form an endless ball chain and the other end cap member 50 is then inserted in the counterbore 58 of the sleeve to close that end of the grooves 30, 32 and to complete this endless track for the balls 48. The assembly is completed by the insertion of the seal 60 and retaining ring 68. The inner shaft 14 may then be inserted within the tubular outer shaft member 12.

During rotation of the shaft assembly, torque is transmitted from the inner shaft 14 to the outer shaft 12 solely by the balls 48. Upon clockwise rotation of the shaft 14 as viewed in FIGURE 4 the driving torque load is transmitted from the hardened areas at the shaft groove sides 24 diagonally through the balls 48 to the opposed hardened areas in the sleeve grooves 32, as indicated by the arrows, whereas the balls in the associated grooves 30 are relieved from any torque load.

Upon rotation in counterclockwise direction driving torque load is transmitted from the hardened areas at the shaft groove sides 25 diagonally through the balls 48 to the opposite hardened areas in grooves 30, whereas the balls in the associated grooves 32 are relieved of any torque load.

It will, of course, be understood that driving torque may also be transmitted from the outer shaft member 12 to the inner shaft member 14 in which case the transmission of torque through the balls 48 will be in opposite direction to that described above.

Upon reciprocation of the shaft 14 under load the loaded balls in grooves 30 or 32 are forced to roll in the direction of movement of the shaft 14 causing the unloaded balls in grooves 30 or 32 to move in an opposite direction due to the endless track arrangement.

Thus, the present invention provides an improved slip joint shaft assembly embodying recirculating antifriction bearing means such as balls which are securely retained within the tubular shaft member without the air of cages or the like so that the inner shaft may be safely withdrawn.

Furthermore, by the provision of glass fiber reinforced synthetic end cap members, impact wear on the arcuate return tracks and brinelling of the antifriction rolling elements is considerably reduced or eliminated.

The present invention may be embodied in other forms without departing from the spirit or essential characteristic thereof. Therefore, the present embodiment is to be considered in all respects as illustrative only.

What is claimed and desired to be secured by Letters Patent is:

1. An extensible torque transmitting shaft assembly comprising a tubular outer shaft telescopingly receiving an inner shaft, an antifriction bearing assembly through which torque is transmitted between said shafts comprising a sleeve associated with said outer shaft having pairs of inwardly opening grooves along the internal surface thereof, independent antifriction rolling elements disposed in said groove pairs adapted for rolling engagement with a corresponding number of associated outwardly opening grooves on said inner shaft, said sleeve including integral means retaining said antifriction elements within said grooves, end cap members at each end of said groove pairs to prevent axial movement of said antifriction elements beyond the ends of said sleeve; and arcuate grooves in said end cap members disposed transverse to the axis of said sleeve and positioned to bridge individually one of each of said pairs of grooves to cause said antifriction rolling elements in each of said pairs of grooves to move along an endless recirculatory path, said end cap members including integral means to prevent displacement of said independent antifriction rolling elements out of said arcuate grooves.

2. A recirculating ball slip joint assembly comprising a tubular outer shaft and an inner shaft, an antifriction bearing unit drivingly connecting said inner shaft with said outer shaft, said antifriction bearing unit comprising a sleeve, longitudinal grooves in said sleeve, adjacent ones of said grooves being in communication with arcuate transverse grooves at each end of said sleeve, grooves on said inner shaft of a width substantially equal to the combined width of adjacent ones of said grooves on said sleeve, balls disposed within said grooves in said sleeve and on said inner shaft, and means formed integrally with said grooves in said sleeve and with said arcuate transverse grooves to prevent said balls from falling out of said sleeve and said transverse arcuate grooves when said inner shaft is withdrawn.

3. An extensible drive shaft comprising an outer tubular member and an inner shaft, antifriction bearing means drivingly connecting said inner shaft with said tubular member, said antifriction bearing means including balls confined in grooves with said tubular member, opposite end caps within said tubular member, said end caps having transverse arcuate recesses connecting adjacent ones of said grooves in said tubular member, and cooperating positioning means in said tubular member and said end caps to accurately locate said arcuate recesses in said end caps in relation to said grooves in said tubular member and prevent said end caps from rotation due to transmission of torque between said inner shaft and said tubular member, said tubular member and said end caps including means formed integrally therewith to confine said balls therein upon removal of said inner shaft.

4. An extensible torque transmitting shaft assembly comprising inner and outer telescoping shafts, one of said shafts having at least one groove construction defining an endless path, a plurality of balls in said groove construction adapted to travel along said endless path upon relative reciprocation of said shafts and said balls being engageable with mating grooves in the other shaft to transmit torque between said shafts and said groove construction including means formed integrally with said one shaft for preventing the displacement of said balls out of said path upon removal of said other shaft.

5. An extensible torque transmitting shaft assembly comprising a tubular outer shaft telescopingly receiving an inner shaft, an antifriction bearing assembly through which torque is transmitted between said shafts comprising a sleeve associated with said outer shaft having pairs of inwardly opening grooves along the internal surface thereof, independent antifriction rolling elements disposed in said groove pairs adapted for rolling engagement with a corresponding number of associated outwardly opening grooves on said inner shaft, means retaining said antifriction elements within said grooves, comprising arcuate side surfaces of said pair of grooves extended beyond the diameter of said antifriction rolling elements, end cap members at each end of said groove pairs to prevent axial movement of said antifriction elements beyond the ends of said sleeve, arcuate grooves in said end cap members disposed transverse to the axis of said sleeve and positioned to bridge individually one of each of said pairs of grooves to cause said antifriction rolling elements in each of said pair of grooves to move along an endless recirculatory path, and means associated with said end cap members to prevent displacement of said independent antifriction rolling elements out of said arcuate grooves.

6. An extensible torque transmitting shaft assembly comprising a tubular outer shaft telescopingly receiving an inner shaft, an antifriction bearing assembly through which torque is transmitted between said shaft comprising a sleeve associated with said outer shaft having pairs of inwardly opening grooves along the internal surface thereof, independent antifriction rolling elements disposed in said groove pairs adapted for rolling engagement with a corresponding number of associated outwardly opening grooves on said inner shaft, means retaining said antifriction elements within said grooves, end cap members at each end of said groove pairs to prevent axial movement of said antifriction elements beyond the ends of said sleeve, arcuate grooves in said end cap members disposed transverse to the axis of said sleeve and positioned to bridge individually one of each of said pairs of grooves to cause said antifriction rolling elements in each of said pair of grooves to move along an endless recirculatory path, and means associated with said end cap members to prevent displacement of said independent antifriction rolling elements out of said arcuate grooves comprising arcuate ledges extending along the inner surface of said end cap members in the path and partly around said antifriction rolling elements.

7. A recirculating ball slip joint assembly comprising a tubular outer shaft and an inner shaft, an antifriction bearing unit drivingly connecting said inner shaft with said outer shaft, said antifriction bearing unit comprising a sleeve, longitudinal grooves in said sleeve, adjacent ones of said grooves being in communication with arcuate transverse grooves at each end of said sleeve, grooves on said inner shaft of a width substantially equal to the combined width of adjacent ones of said grooves on said sleeve, balls disposed within said grooves in said sleeve and on said inner shaft, and means associated with said grooves in said sleeve and with said arcuate transverse grooves to prevent said balls from falling out of said sleeve and said transverse arcuate grooves when said inner shaft is withdrawn, said means comprising integral extensions of surfaces defining the sides of said sleeve grooves and said transverse arcuate grooves beyond the diameter of said balls.

8. A recirculating ball slip joint assembly comprising a tubular outer shaft and an inner shaft, an antifriction bearing unit drivingly connecting said inner shaft with said outer shaft, said antifriction bearing unit comprising an outer shaft sleeve, longitudinal grooves in said sleeve, adjacent ones of said grooves being in communication with bridging transverse grooves at each end of said sleeve, associated grooves on said inner shaft, freely displaceable balls disposed in a continuous row within said grooves in said sleeve and extending into the grooves on said inner shaft, and means associated with said grooves in said sleeve to retain the balls in said sleeve when said inner shaft is withdrawn comprising lip means along each sleeve groove restricting the transverse throat of each sleeve groove to a dimension less than the diameter of the balls therein.

9. The recirculating ball slip joint assembly, defined in claim 1, wherein said end cap members are integrally molded members formed of reinforced plastic.

10. The recirculating ball slip joint assembly defined in claim 9, wherein said end cap members are composed of glass fibre reinforced nylon.

References Cited

UNITED STATES PATENTS

| | | | |
|---|---|---|---|
| 846,079 | 3/1907 | Yost | 64—23 |
| 2,681,836 | 6/1954 | Jarund | 308—6 |
| 2,908,152 | 10/1959 | Anderson | 64—23 |
| 2,928,701 | 3/1960 | Ferdig. | |
| 3,304,745 | 2/1967 | King et al. | 64—23 |
| 3,318,109 | 5/1967 | Ressler et al. | 64—23 |
| 3,360,308 | 12/1967 | Grabowski et al. | 64—23.7 |

FOREIGN PATENTS

| | | |
|---|---|---|
| 55,557 | 5/1952 | France. |
| 872,549 | 7/1961 | Great Britain. |

MILTON KAUFMAN, Primary Examiner